(12) United States Patent
Welcome

(10) Patent No.: US 9,765,290 B2
(45) Date of Patent: Sep. 19, 2017

(54) SOLID SOAP FRAGMENT MELTING APPARATUS AND METHOD

(71) Applicant: Wanda V. Welcome, Stamford, CT (US)

(72) Inventor: Wanda V. Welcome, Stamford, CT (US)

(*) Notice: Subject to any disclaimer, the term of this patent is extended or adjusted under 35 U.S.C. 154(b) by 681 days.

(21) Appl. No.: 13/933,879

(22) Filed: Jul. 2, 2013

(65) Prior Publication Data

US 2015/0008620 A1    Jan. 8, 2015

(51) Int. Cl.
   *C11D 13/30* (2006.01)
   *C11D 13/16* (2006.01)
   *B29C 31/04* (2006.01)

(52) U.S. Cl.
   CPC .............. *C11D 13/16* (2013.01); *B29C 31/04* (2013.01); *C11D 13/30* (2013.01)

(58) Field of Classification Search
   CPC ................................ C11D 13/16; C11D 13/30
   USPC ......... 264/911; 249/108, 109, 141; 425/144, 425/448
   See application file for complete search history.

(56) References Cited

U.S. PATENT DOCUMENTS

| | | | |
|---|---|---|---|
| 3,876,105 A * | 4/1975 | Kelling | B29B 13/022 118/202 |
| 4,030,867 A * | 6/1977 | Everman | C11D 13/30 219/421 |
| 4,035,122 A | 7/1977 | Cavanaugh | |
| 4,296,064 A | 10/1981 | Satcher | |
| 4,308,157 A | 12/1981 | Di Giovanna | |
| 4,313,537 A | 2/1982 | Collet | |
| 4,344,529 A | 8/1982 | Ibarzabal | |
| 4,781,564 A | 11/1988 | Cerrone | |
| 4,917,589 A | 4/1990 | Manderson | |
| 5,030,405 A | 7/1991 | Smith et al. | |
| 5,368,387 A | 11/1994 | Creighton et al. | |
| 5,636,922 A | 6/1997 | Clark | |
| 5,674,824 A | 10/1997 | Eschette | |
| 5,876,769 A | 3/1999 | Dowden et al. | |
| 5,968,390 A * | 10/1999 | Lister | C11D 13/00 219/421 |
| 6,106,270 A | 8/2000 | Hardin | |
| 6,459,073 B1 | 10/2002 | Berger | |
| 7,677,386 B1 | 3/2010 | Kumar | |
| 8,303,203 B2 | 11/2012 | Bahash | |
| 8,529,239 B1 * | 9/2013 | Black, Jr. | B29B 13/022 425/144 |
| 2005/0261149 A1 | 11/2005 | Mekus | |
| 2009/0029891 A1 | 1/2009 | Callahan | |
| 2012/0071387 A1 | 3/2012 | Aesch, Jr. | |
| 2015/0216368 A1 | 8/2015 | McClendon | |

FOREIGN PATENT DOCUMENTS

CN   201670833 U  * 12/2010
KR   20110009328 A * 1/2011

* cited by examiner

*Primary Examiner* — Atul P. Khare
(74) *Attorney, Agent, or Firm* — The Roy Gross Law Firm, LLC; Roy Gross

(57) ABSTRACT

An apparatus and method for melting soap fragments to create a soap bar from the soap fragments. The apparatus includes various replaceable molds to create soap bars having various shapes.

18 Claims, 5 Drawing Sheets

SOLID SOAP FRAGMENT MELTING APPARATUS AND METHOD

FIELD OF THE INVENTION

This invention relates to a solid soap fragment melting apparatus and method of melting small pieces of soap to create a soap bar from the soap fragments.

BACKGROUND OF THE INVENTION

Small pieces of bar soap often go to waste in a person's bathroom as small pieces of soap accumulate and are not efficiently used. Often, people end up throwing away small pieces of bar soap, as it is difficult to wash a person's body once a piece of soap reaches a small size. This is because there is often not enough surface area left on the soap to both hold the piece of soap and also to wash a person's body. Thus, small pieces of soap are often discarded, which is wasteful and expensive.

In today's society, luxury soaps can often be very expensive and wasting small pieces of soap can often result in a person losing hundreds of dollars a year. Thus, it is desirable to provide a device that saves or recycles small pieces of soap.

Known prior art devices include U.S. Patent Publication No. 2012/0071387 to Aesch, Jr.; U.S. Patent No. 2009/0029891 to Callahan; U.S. Patent Publication No. 2005/0261149 to Mekus; U.S. Pat. No. 8,303,203 to Bahash; U.S. Pat. No. 7,677,386 to Kumar; U.S. Pat. No. 6,459,073 to Berger; U.S. Pat. No. 6,106,270 to Matthews; U.S. Pat. No. 5,876,769 to Dowden et al.; U.S. Pat. No. 5,674,824 to Eschette; U.S. Pat. No. 5,636,922 to Clark; U.S. Pat. No. 5,368,387 to Creighton et al.; U.S. Pat. No. 5,030,405 to Smith et al.; U.S. Pat. No. 4,917,589 to Manderson; U.S. Pat. No. 4,781,564 to Cerrone; U.S. Pat. No. 4,344,529 to Ibarzabal; U.S. Pat. No. 4,313,537 Collet; U.S. Pat. No. 4,308,157 to Di Giovanna; U.S. Pat. No. 4,296,064 to Satcher; and U.S. Pat. No. 4,035,122 to Cavanaugh.

However, these prior art devices do not provide an ergonomic apparatus for forming a soap bar that allows for a person to save or recycle small pieces of soap by melting the small pieces of soap and accumulating the small pieces of soap into a replaceable mold that can have various shapes and designs, such that soap bars are created having various designs.

What is desired therefore is an apparatus and method for allowing a person to save or recycle small pieces of soap, and therefore, more efficiently using bar soap and saving money in the process.

SUMMARY OF THE INVENTION

Accordingly, it is an object of the present invention to provide an apparatus and method for allowing a person to save or recycle small pieces of soap, therefore, more efficiently using bar soap and saving money in the process.

It is a further object of the present invention to provide an ergonomic apparatus for forming a soap bar that allows for a person to save or recycle small pieces of soap by melting the small pieces of soap and accumulating the small pieces of soap into a replaceable mold that can have various shapes.

These and other objectives are achieved by providing an apparatus for forming a soap bar from soap fragments comprising: a housing, said housing having a top section, the top section including a lid, a body, the body including a heating element for heating soap fragments, and a base, the base being slidably removable from the body; a container for storing soap fragments, said container located within the body, said container having an aperture at the bottom of said container, where the heating element in the body heats the soap fragments to form liquefied soap, where the liquefied soap is able to pass from said container into the base; and a mold, the mold being located within the base, where the liquefied soap is collected by the mold and hardens to form the soap bar.

In certain embodiments, the apparatus further comprises a temperature control, the temperature control being located on a front face of said body, the temperature control for adjusting temperature within the body of said apparatus to liquefy the soap particles.

In certain embodiments, the apparatus further comprises a cooling element, the cooling element located within the mold or within the base.

In certain embodiments, the mold is removable from the base, and wherein the mold is replaceable with a second mold, the second mold having a different shape than the mold.

In certain embodiments, said container is removable from the body of the housing.

In certain embodiments, said container has an elliptical shape, the container having an upper portion that is received by the body to hold the container in place.

In certain embodiments, the heating element is contained within an inner body, said inner body located within the body of said shell, said inner body supporting the container for storing soap fragments.

In certain embodiments, the mold is replaceable with a second mold.

In certain embodiments, the heating element is a heat tape.

In certain embodiments, the apparatus further comprises a plate, wherein the plate is located between the aperture of the container and the base, the plate keeping the soap fragments from entering into the base.

In certain embodiments, the plate is movable, such that the plate is moved from a closed position, whereby it keeps the soap fragments from entering into the base, to an open position, whereby the soap fragments and/or the liquefied soap can enter the base.

In certain embodiments, the plate is controlled by a knob, wherein the movement of the knob causes the plate to move from the closed position to the open position and vice versa.

In certain embodiments, the knob is slidably moved from a first position to a second position, where the knob is connected to the plate by a wire.

In certain embodiments, the lid is insulated.

Other objects of the invention are achieved by providing a method for forming a soap bar from soap fragments comprising: placing soap fragments is an apparatus having a housing, said housing having a top section, the top section including a lid, a body, the body including a heating element for heating soap fragments, and a base, the base being slidably removable from the body; a container for storing soap fragments, the container located within the body, the container having an aperture at the bottom of the container; a plate, the plate located between the aperture of the container and the base, the plate keeping the soap fragments from entering into the base; and a mold, the mold being located within the base; heating the soap fragments to a temperature at which the soap fragments melt to form liquefied soap; passing the liquefied soap through the aperture of the container into the base; collecting the liquefied soap in the mold; shaping the liquefied soap to the shape of the mold; and hardening the liquefied soap to form a solid bar of soap.

In certain embodiments, the apparatus further includes a cooling element, the cooling element located within the mold or within the base.

In certain embodiments, the method further comprises cooling the liquefied soap via the cooling element, so that the liquefied soap is hardened to form the solid bar of soap.

In certain embodiments, the method further comprises moving the plate from a closed position, whereby it keeps the soap fragments from entering into the base, to an open position, whereby the soap fragments and/or the liquefied soap can enter the base.

In certain embodiments, the step of moving the plate from a close position to an open position is performed by actuating a knob that causes the plate to move from the closed position to the open position and vice versa.

Other objects of the invention are achieved by providing an apparatus for forming a soap bar from soap fragments comprising: a housing, said housing having a top, a body, and a base, said top attached to said base via said body, the body including a heating element for heating soap fragments into liquefied soap; a container for storing the soap fragments, the container being located within the body of the housing; and a mold, the mold being located within the base, where the liquefied soap is collected by the mold and hardens to form the soap bar.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

DETAILED DESCRIPTION OF THE INVENTION

Figure 1:
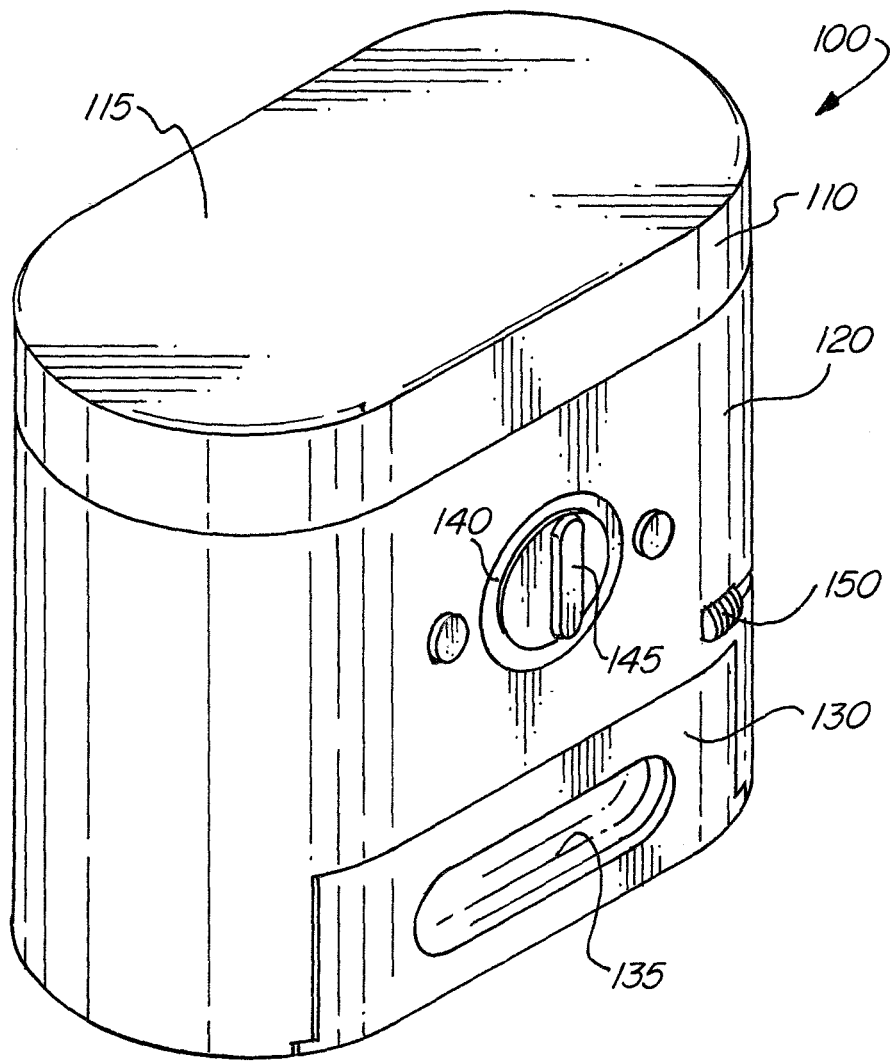
FIG. 1 is a perspective view of an apparatus of an embodiment of the present invention.

FIG. 1 illustrates an apparatus of the invention. FIG. 1 shows apparatus 100 having a top portion 110 having a surface 115, a body 120 and a base portion 130, the base portion being shown as being removable. The base portion has a recessed area 135, allowing the base portion 130 to be easily grasped by a user and removed. The design is shown being ergonomic and may have a handle (not shown).

In FIG. 1, the body 120 is shown having a knob 140 with a turnable handle 145, the turnable handle 145 being able to control the heat within the body 120 of the apparatus 100. In certain embodiments, the heat within the body 120 of the apparatus heats soap fragments at a temperature of 160° F., so that the soap is melted into liquefied soap.

In certain embodiments, the turnable handle 145 is on a timer, such as between 0-15 minutes such that the timer is wound by a spring and turns off once the soap fragments in the inside of the apparatus have been melted.

Figure 6:
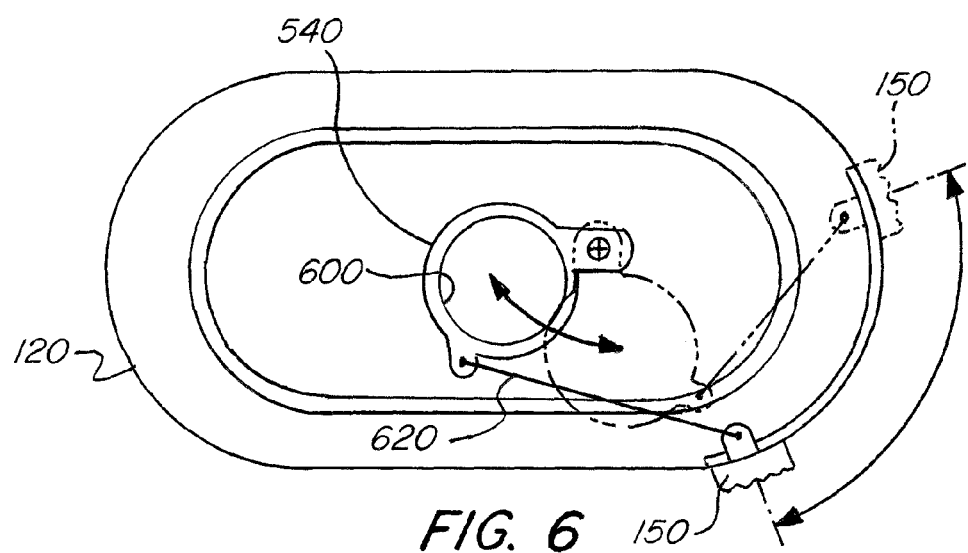
FIG. 6 is sectional view of the inside of FIG. 5.

FIG. 1 also shows knob 150, such that control of the knob 150 controls the plate within the body 120, the plate preventing the soap fragments from entering into the mold until the soap has been melted. The knob 150 is connected via a linking device, such as a wire, as shown in FIG. 6. The knob 150 may be connected to a plate via other connection mechanisms in other embodiments of the invention.

Figure 2:
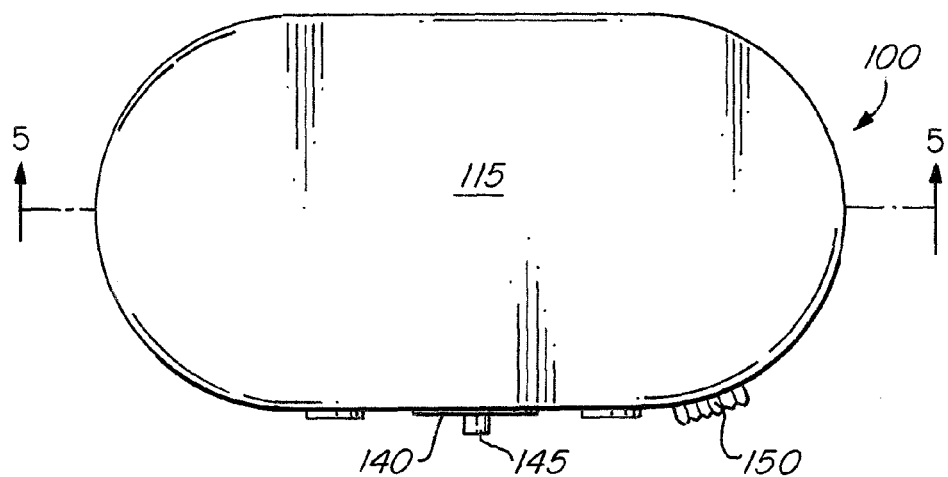
FIG. 2 is a top view of the apparatus of FIG. 1.

FIG. 2 shows a top view of FIG. 1. FIG. 2 shows top portion 110 having a lid 115. In certain embodiments, the lid may be insulated. FIG. 2 also shows the knob 140 and turnable handle 150 as well as the knob 150, which may be slidable along a track. In certain embodiments, the lid 115 is made of a metal. In other embodiments, the lid 115 may be insulated, so that objects can be stored on top of the lid without having those objects heated. This allows for storing the apparatus 100 in a bathroom, and maximizing space in the bathroom.

Figure 3:
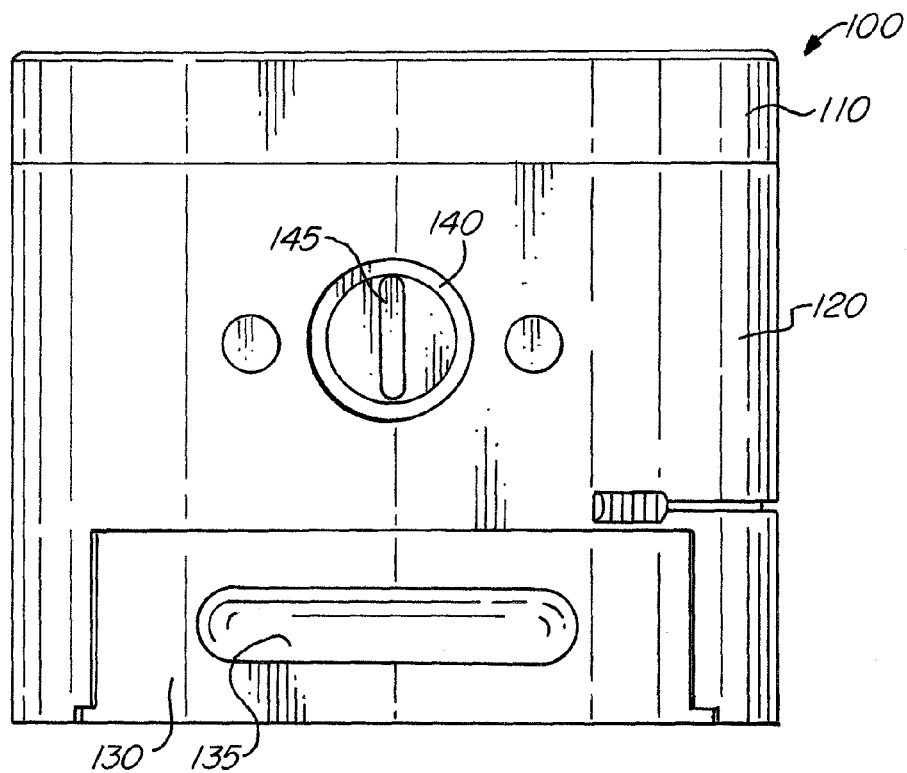
FIG. 3 is a front view of the apparatus of FIG. 1.

FIG. 3 shows a front view of the apparatus 100 of FIG. 1. FIG. 3 shows the top portion 110, body portion 120, and removable base 130, as well as the turnable handle 145, knob 140 and recessed area 135. The slidable knob 150 and guide 138 are also shown but not numbered in FIG. 3.

Figure 4:
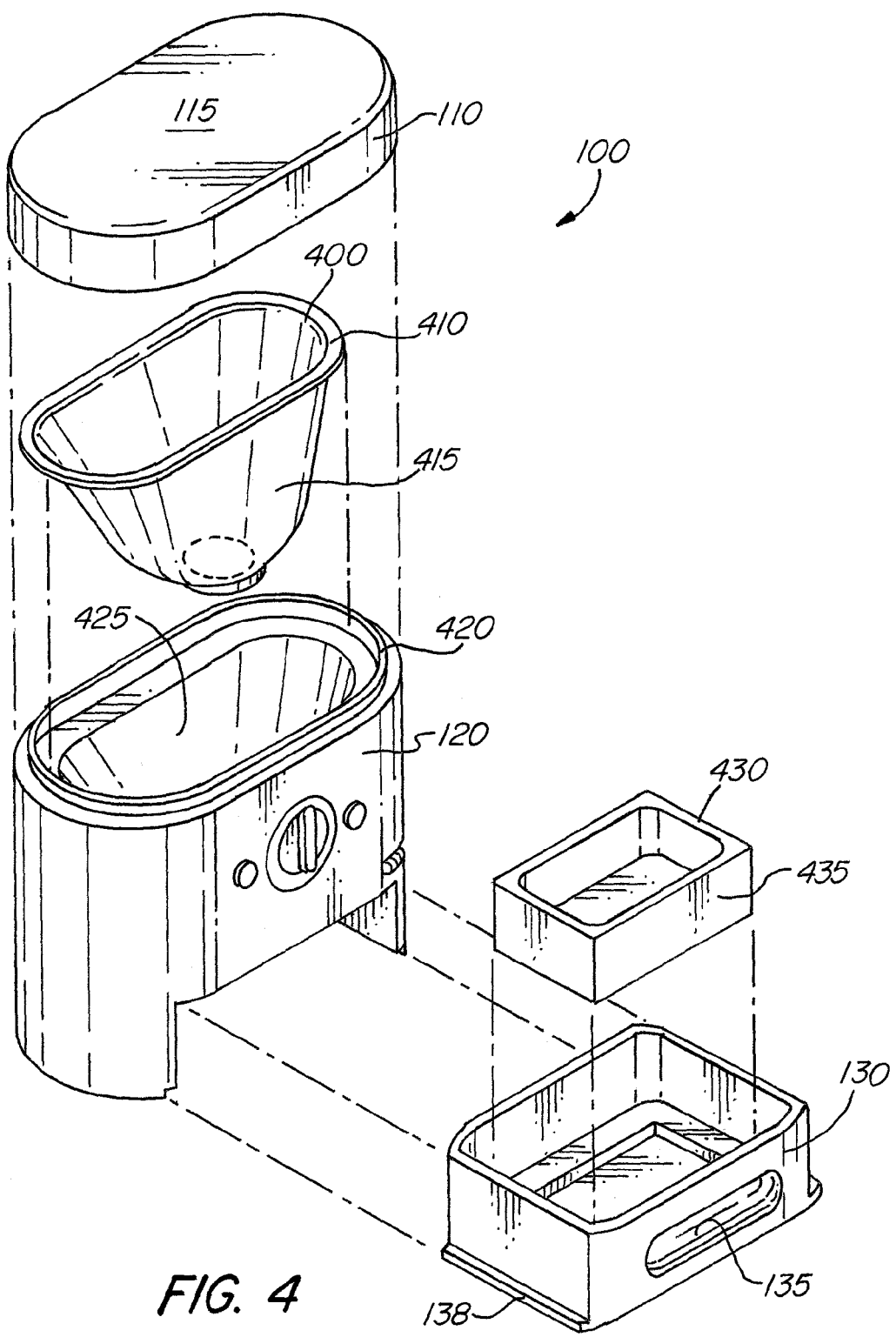
FIG. 4 is an exploded view of the apparatus of FIG. 1 showing the contents of the inside of the apparatus.

FIG. 4 shows an exploded view of apparatus 100 of FIG. 4. FIG. 4 shows top portion 110 having a lid, container 400, body 120, base 130 and mold 430. The container 400 is shown having a top rim 410 and a body 415. In certain embodiments, the rim 410 and body 415 are made of metal, a metal alloy or a material that transfers heat. This allows the soap fragments stored in the container to be melted when the heating element in the body of the container 400 becomes hot.

The body 120 is shown having a rim 420 for receiving the top rim 410 of the container 400. The body is shown having an inner body 425, the inner body 425 able to receive the container 400. The container is removable, so that it can easily be cleaned and sanitized after being used.

Also shown in FIG. 4 is base 130 having a cutout for receiving mold 430. The mold 430 has an exterior 435 that fits within the cutout of the base 130. The base 130 has guide 138, such that the guide 138 is received by the body 120, allowing the base 130 to be slidable and removable within the body 120.

Figure 5:
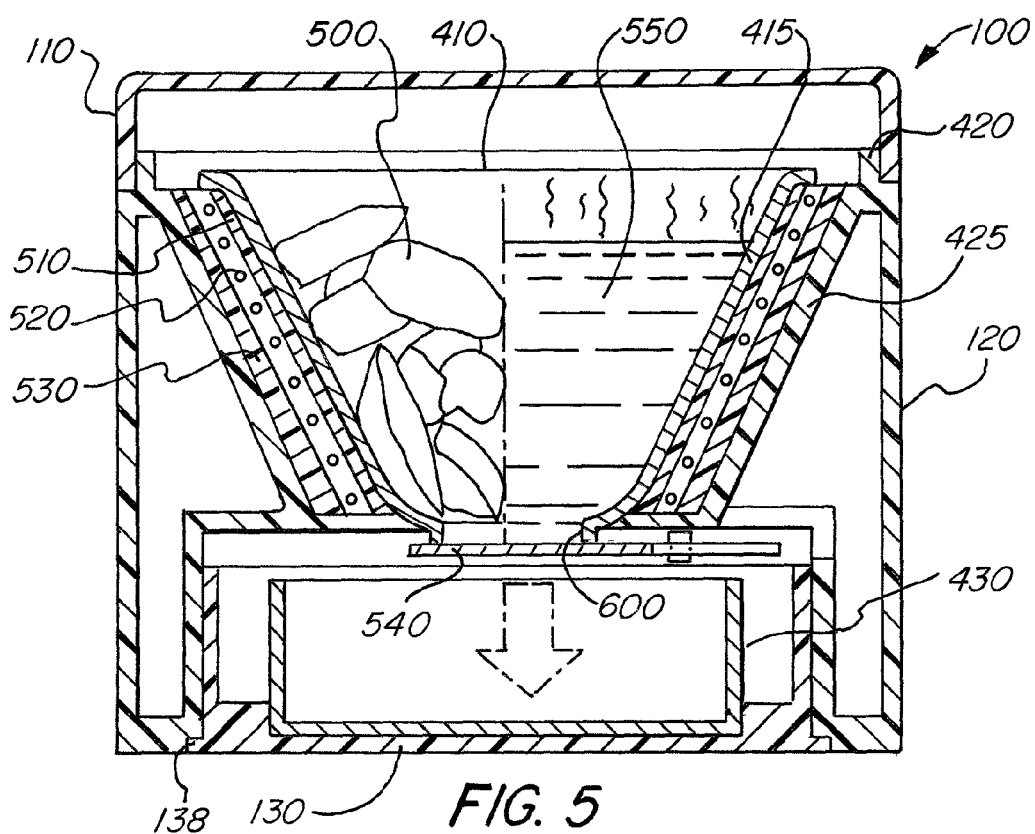
FIG. 5 is a cross section view of the apparatus of FIG. 1.

FIG. 5 is a cross section view of the apparatus of FIG. 1 along axis 5-5 shown in FIG. 2. FIG. 5 shows top portion 110, body 120 and base portion 130 contained within the body 120 using guide 138. FIG. 5 shows container 400 being received by inner body 420 of the body. FIG. 5 also shows soap fragments 500 being collected by the container 400. The soap fragments 500 are melted into liquefied soap 550.

FIG. 5 also shows the walls of inner body 425 supporting the container 400. In between the inner body and the container are two layers of dampening material 510 and 530 surrounding a heating element 520. In certain embodiments, the heating element 520 is a heat tape. The heating element 520 is used to heat the soap fragments or soap slivers, such that the soap is melted and turned into liquefied soap 550. In certain embodiments, there are no layers of dampening or insulating material necessary.

FIG. 5 also shows plate 540, plate 540 located at the bottom of the aperture 600 in the container 400. The plate 540 prevents the soap fragments from falling into the base 130. The plate 540 can be rotatable as shown in FIG. 6.

FIG. 6 shows the base being rotatable from an open position where the plate does not cover the aperture 600 at the bottom of the container 400 to a closed position where the plate covers the aperture 600 at the bottom of the container. The plate 540 is shown being connected by a wire 620 to the knob 150, which is shown on the face of the body 120. The knob 150 is shown and is slidable along a track, whereby the plate 540 is rotated from the open to closed position and vice versa. In certain embodiments, wire 620 may be replaced with various other connection mechanisms to allow the plate 540 to rotate from an open to a closed position and vice-versa.

Figure 7:
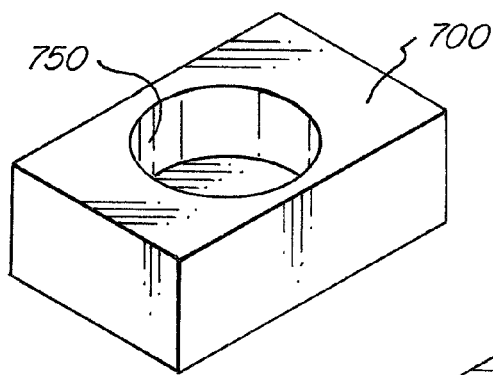
FIGS. 7-9B are examples of molds used in the apparatus of FIG. 1.
Figure 8:
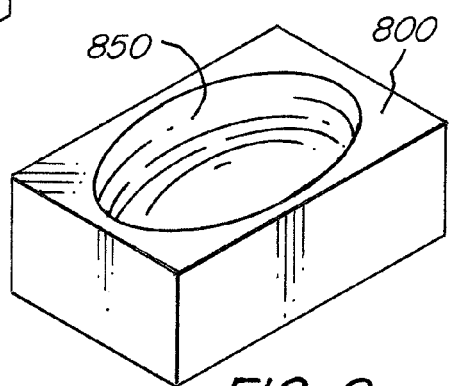

FIGS. 7-9B show various molds that can be inserted into base 130 of the apparatus 100. FIG. 7 shows a mold 700 having a circular design 750. FIG. 8 shows a mold 800 having an oval design 850. Other designs of molds may be used with the apparatus and are contemplated in embodiments of the invention.

In certain embodiments, the molds can include various stamps, so that insignia can be created. Thus, people can create bars of soap with their initials and of various designs for children, such as having a bar of soap in the shape of an animal.

Figure 9A:
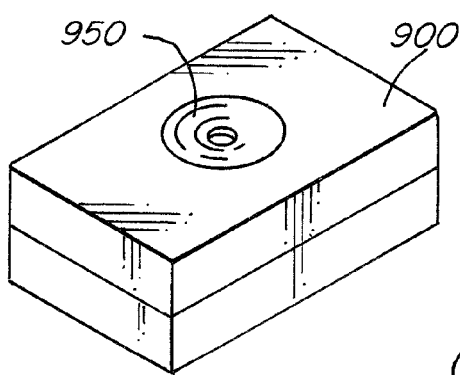
Figure 9B:
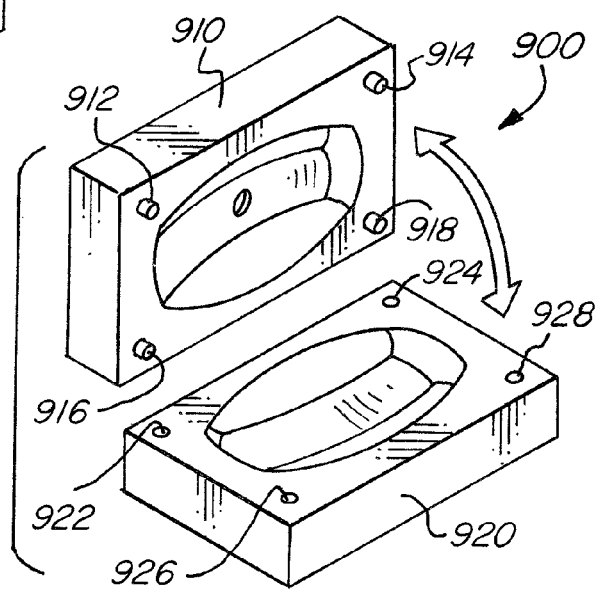

FIGS. 9A-9B show a two piece mold 900 having a bore 950 that allows the liquefied soap to enter the mold 900. Mold 900 is made of top piece 910 and bottom piece 920. Pegs 912, 914, 916 and 918 in the top piece 910 are received by holds 922, 924, 926 and 928 of bottom piece 920. The mold 900 is used to form a bar of liquefied soap.

In certain embodiments, the mold and/or base contains a cooling element such that the mold and/or base is cold and causes the liquefied soap to harden.

In certain embodiments, the mold and/or base can be placed in a refrigerator or freezer so as to allow the bar of soap to harden.

In certain embodiments of the invention, the apparatus is used to form liquefied soap using a method whereby the soap fragments are heated and then hardened in the mold to form a soap bar.

In certain embodiments of the invention, the soap fragments are melted at a temperature of approximately 160° F., and then are hardened at room temperature to form the soap bar.

In certain embodiments, the apparatus of the invention involves a one-piece ergonomic design that is small enough to be stored in a bathroom. In certain embodiments of the invention, the aperture and plate design at the bottom of the container 400 is replaced by a Swiss-cheese design, whereby holes are provided, which are small enough to prevent soap fragments from passing through, while being large enough to allow liquefied soap to pass through. In this embodiment of the invention, the knob 150 is not necessary. In this embodiment, the holes are considered drainage holes that are heated via a heating element.

In certain embodiments of the invention, the device is powered via a battery and in other embodiments the device has an electrical cord that plugs into an outlet.

While the invention has been specifically described in connection with certain specific embodiments thereof, it is to be understood that this is by way of illustration and not of limitation and that various changes and modifications in form and details may be made thereto, and the scope of the appended claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention

What is claimed is:

1. An apparatus for forming a soap bar from soap fragments, the apparatus comprising:
    a housing, said housing having:
        a top section, the top section including a lid;
        a housing body, the housing body including an angled inner body, and the inner body including a heating element running along the angle of the inner body so that the inner body hugs the heating element; and
        a base, the base being slidably removable from the housing body, and the base comprising a cutout,
    a removable container having a container body resting against and along the angle of the heating element, an angle of the container body matching the angle of the inner body and heating element, the container body configured to store solid soap fragments and to hold the solid soap fragments during melting into liquefied soap by heat applied by the heating element, and the container body having an aperture at the bottom of the container body;
    a plate configured to close the bottom aperture during said storage and to retain the soap fragments and liquefied soap in the container body during said heating and melting; and
    a mold seated within the cutout of the base,
    wherein the plate is further configured to open after said heating and melting so that the liquefied soap passes through the bottom aperture and into the mold for shaping and hardening into the soap bar.

2. The apparatus of claim 1, further comprising a temperature control, the temperature control being located on a front face of said housing body, the temperature control configured to adjust temperature of the heating element, and the temperature control comprising a manual temperature control or a timer.

3. The apparatus of claim 1, further comprising a cooling element, the cooling element located within the mold or within the base.

4. The apparatus of claim 1, wherein the mold is a first mold configured to be removed from the base, and wherein the first mold is configured to be replaced by a second mold, the second mold having a different shape than the first mold for forming a different soap bar shape.

5. The apparatus of claim 4, wherein the first mold has a circular design and the second mold has an oval design, and wherein the circular and oval designs are configured to form the soap bar into a circular and oval shape, respectively.

6. The apparatus of claim 1, wherein the heating element is a heat tape.

7. The apparatus of claim 1, wherein the plate is located between the bottom aperture of the container body and the base.

8. The apparatus of claim 7, wherein the plate is movable from the closed position to the open position.

9. The apparatus of claim 8, wherein the plate is controlled by a knob, and wherein movement of the knob causes the plate to move from the closed position to the open position and vice versa.

10. The apparatus of claim 9, wherein the knob is slidably movable from a first position to a second position, and wherein the knob is connected to the plate by a wire.

11. The apparatus of claim 1, wherein the heating element is powered via a battery.

12. The apparatus of claim 1, wherein the mold is a first mold of a set of molds, each mold of the set of molds being capable of being seated within the cutout of the base and being subsequently removable from the base, with one of the molds of the set of molds at a time sitting within the base during use of the apparatus and with the molds of the set of molds having different cavity shapes for forming different soap bar shapes.

13. The apparatus of claim 1, wherein the soap fragments rest on the plate at the aperture during said heating and melting from solid fragments into liquefied soap within the container body.

14. The apparatus of claim 1, wherein:
the removable container further comprises a top rim; and
the housing body further comprises a receiving rim configured to receive the top rim of the container so as to hold the container inside the housing body against the heating element.

15. The apparatus of claim 1, wherein the removable container is configured to be removed from the housing body and sanitized after use.

16. The apparatus of claim 1, wherein the lid is an insulating lid.

17. The apparatus of claim 1, further comprising two layers of dampening material arranged between the inner body and container body and surrounding the heating element.

18. The apparatus of claim 1, wherein the container body is configured to act as a funnel for the liquefied soap as a result of the angle of the container body so as to allow the liquefied soap to pass out of the container body, through the aperture, and into the mold by gravity flow.

* * * * *